Jan. 16, 1968   R. HAGEN   3,363,282
APPARATUS FOR THE PRODUCTION OF HOLLOW PLASTIC ARTICLES
Filed July 28, 1964   4 Sheets-Sheet 1
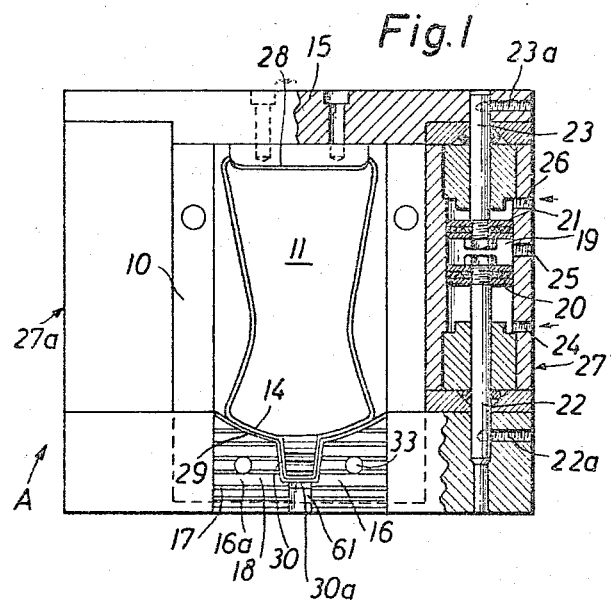
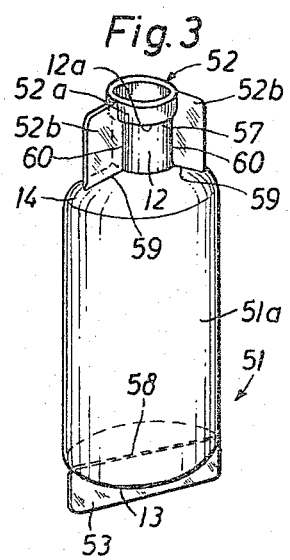
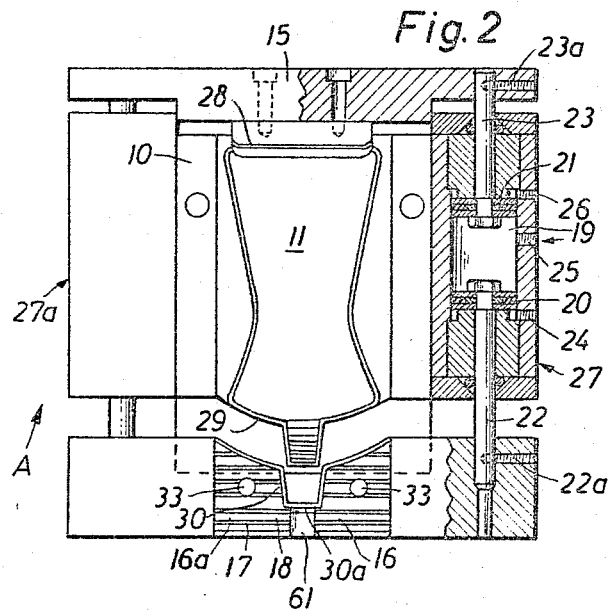
INVENTOR
REINOLD HAGEN
BY
Michael J. Striker
his ATTORNEY

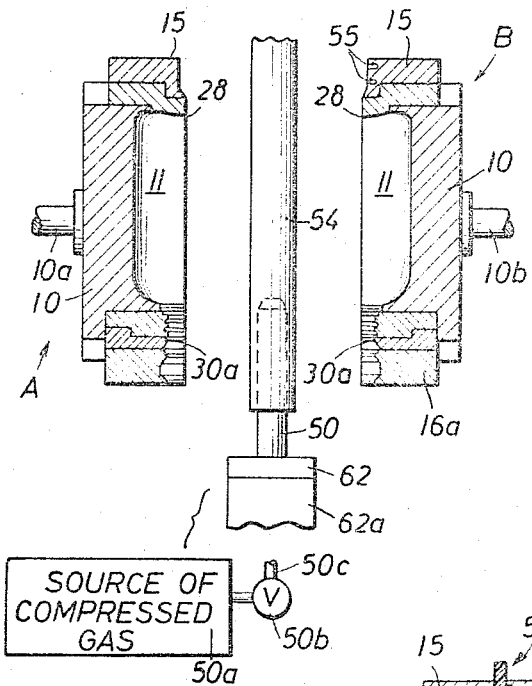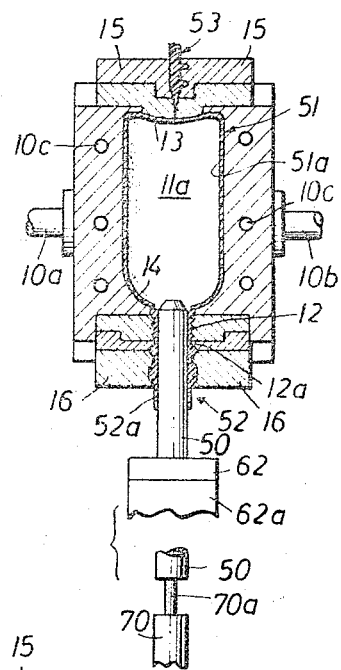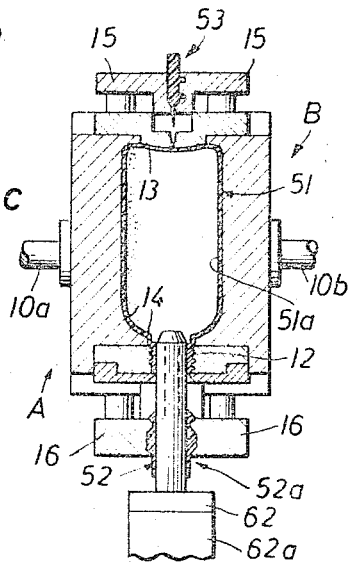

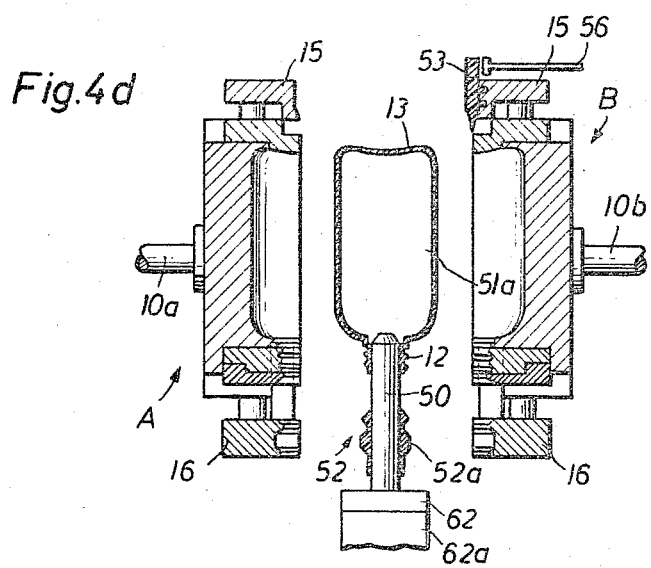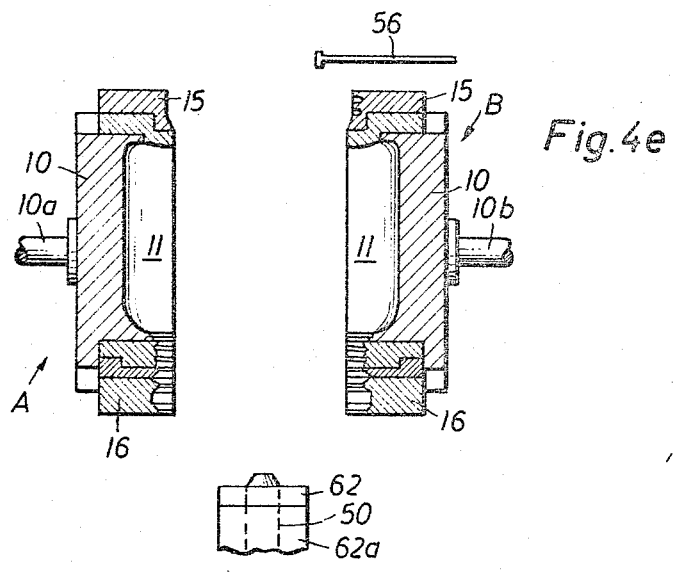

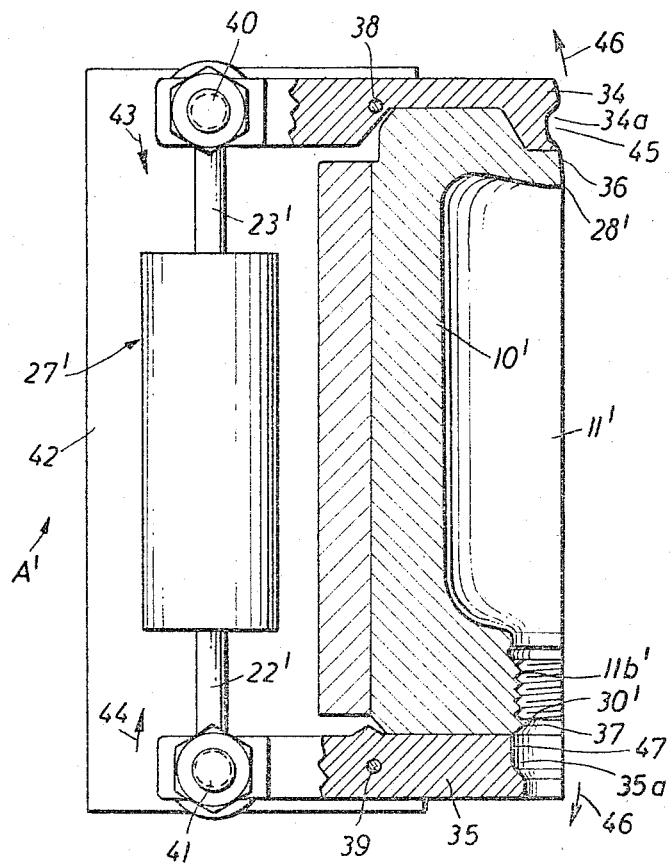

United States Patent Office 3,363,282
Patented Jan. 16, 1968

3,363,282
APPARATUS FOR THE PRODUCTION OF
HOLLOW PLASTIC ARTICLES
Reinold Hagen, Hangelar uber Siegburg,
Rhineland, Germany
Filed July 28, 1964, Ser. No. 385,657
16 Claims. (Cl. 18—5)

The present invention relates to an apparatus for the production of bottles and similar hollow articles which consist of thermoplastic or similar material. More particularly, the invention relates to an improved apparatus for the production of hollow plastic articles by the so-called blowing method according to which a blank is expanded by blasts of compressed gaseous fluid to follow closely the outlines of surfaces surrounding a mold cavity whereby the blowing mandrel which admits compressed fluid simultaneously cooperates with an open-and-shut blow mold to calibrate one end portion of the hollow article. If the article is a bottle, the mandrel will cooperate with the mold sections to shape the neck portion of the bottle.

In the production of bottles and similar hollow plastic articles by the blow molding method, any surplus of plastic material is squeezed out between the sections or half dies of the blow mold to form so-called burrs, flashes or fins which are connected with the article by thin webs of plastic material so that each fin is readily separable therefrom. Such separation of fins or flashes may be effected by hand or by specially constructed fin-removing or deburring devices which add considerably to the cost of the apparatus and which, to my knowledge, remove the fins subsequent to ejection of the finished article from its mold. For example, such fin-removing devices may be constructed in a manner as disclosed in my copending application Ser. No. 344,419. If the fins are removed by hand, each apparatus must be serviced by one or more attendants, depending on the output of the apparatus, and the attendants must be trained to rapidly separate the fins from the ends or other parts of consecutively formed articles. Thus, while a blow molding apparatus is normally capable of producing hollow articles in a fully automatic way, it must be attended by at least one person for the sole purpose of separating the fins. Such separation of fins is desirable not only because the fins detract from the appearance of the ultimate product but also because the fins could interfere with the washing, sterilizing, filling, sealing, capping, packaging and other operations which follow the blow molding step. On the other hand, all automatic deburring or fin-separating devices of which I have knowledge at this time are rather complicated and hence costly and bulky assemblies so that their use might be warranted in a mass-producing plant but is less economical in a smaller plant or when a blow molding apparatus is utilized for the production of limited numbers of hollow plastic articles.

Accordingly, it is an important object of the present invention to provide an improved blow molding apparatus which is equipped with novel deburring or fin-separating devices and wherein such fin-separating devices are capable of breaking away the fins in a fully automatic way in synchronism with the operation of parts which are utilized to transform a parison or an otherwise configurated blank into a hollow plastic article.

Another object of the invention is to provide improved fin-separating devices which are particularly suited for removal of fins from the bottom walls and especially from neck portions of plastic bottles and similar hollow articles.

A further object of the invention is to provide fin-separating devices of the just outlined characteristics which are constructed and assembled to remove fins in a fully automatic way and without any supervision, which may be mounted directly on the parts of the blow mold to form therewith an exceptionally compact unit, and which are capable of breaking away fins regardless of variations in the thickness of webs which connect such fins with the remainder of the hollow article.

Still another object of the invention is to provide a fin-separating device which is particularly suited for removal of fins from the neck portion of a thermoplastic bottle or a similar hollow article, which can be installed at reasonable cost in many types of presently used blow molding apparatus, which is capable of separating the fins without causing damage to or deformation of the finished article, and which occupies space that is normally available in existing blow molding apparatus.

An additional object of the invention is to provide a blow mold which is provided with improved fin forming and separating elements and wherein the mounting and construction of the elements are such that the operation of the mold is not slowed down or otherwise affected by the provision of such elements and/or by separation of fins from the hollow plastic article which is being formed in the mold cavity.

A further object of the invention is to provide a blow mold of the just outlined characteristics wherein the construction and mounting of fin forming and separating elements are such that the separation of fins takes place automatically in response to opening of the mold so that the output of the apparatus is not affected by the provision of such elements.

With the above objects in view, one feature of the present invention resides in the provision of an apparatus for transforming tubular parisons and other types of plastic blanks into bottles and similar open-ended hollow articles. The apparatus comprises an open and shut mold having two mirror symmetrical sections in the form of half dies which are movable toward and away from each other and each of which comprises a carrier and a separating element movable with reference to its carrier between an extended or separating and a retracted position, the two sections together defining a blank-receiving mold cavity and having pairs of cooperating mirror symmetrical pinching edges to form in the blank webs which connect a freshly formed article with fins constituting surplus material of the blank, inner surfaces provided on the separating elements to preferably engage only the fins and having channels which communicate with the mold cavity when the mold is shut and the separating elements are moved to their retracted positions, a blowing mandrel arranged to extend through the channels and into the mold cavity so as to expand the blank against the sections whereby surplus material forms between the surfaces of the sections one or more fins and the pinching edges form webs which connect the fins with the thus obtained hollow article, and actuating means for moving the separating elements between extended and retracted positions whereby the elements destroy the webs to thus separate the fins from the article on movement from their retracted positions.

The separating elements may be mounted to reciprocate or to pivot with reference to their carriers, and the fin-engaging surfaces of such elements may be formed with unevennesses in the form of grooves, ribs, recesses, studs and similar depressions or protuberances to insure that the fins are positively entrained when the elements are caused to move from their retracted positions. It often suffices to merely roughen the inner surfaces of the separating elements, particularly if the elements are moved to extended positions while the mold remains shut.

The pinching edges may form an annulus about the blowing mandrel so that the fin may comprise a ring-shaped portion. However, such pinching edges may form on the article additional webs which connect bladed or wing-shaped fin portions with the neck portion and/or shoulder portion of a bottle or a similar hollow article.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 1 illustrates the inner side of a half die or mold section which is constructed in accordance with a first embodiment of the present invention, the fin-separating elements on the half die being shown in retracted position and certain parts of the half die being illustrated in vertical section;

FIG. 2 illustrates the half die with the fin separating elements in extended positions;

FIG. 3 is a perspective view of a plastic article which is being produced in a blow mold utilizing two half dies of the type shown in FIG. 1 or 2;

FIG. 4a is a diagrammatic smaller-scale central vertical section through the mold with the fin-separating elements on the half dies shown in retracted positions and with the blowing mandrel extending into one end portion of a tubular blank, the mold being shown in open position to provide room for insertion of the blank;

FIG. 4b is a similar central vertical section but showing the mold in closed or shut position during or subsequent to blowing;

FIG. 4c is a further central vertical section with the mold shown in closed position and the fin-separating elements on the half dies shown in extended positions subsequent to separation of fins from the top and bottom ends of the freshly formed article;

FIG. 4d illustrates the mold in open position while the freshly formed article and one of the fins remain supported by the flowing mandrel;

FIG. 4e is a view corresponding to that of FIG. 4a but showing the mandrel in retracted position following separation of the article and of the lower fin;

FIG. 5 is a tranverse vertical section through a modified half die with the fin-separating elements shown in retracted positions.

Referring first to FIGS. 1 and 2, there is shown a half die A forming one section of an open and shut mold which is used to produce plastic bottles by the blow molding method. The mold cooperates with a combination blowing and calibrating mandrel 50 (shown in FIGS. 4a to 4e) which latter serves to admit blasts of compressed air or another gas into the interior of a deformable tubular blank 54 to thereby expand the material of the blank into contact with the surfaces surrounding a composite mold cavity including two mirror symmetrical cavities 11 each of which is defined by one of the half dies. While the drawings illustrate half dies and molds cooperating with blowing mandrels which are located at a level below the mold cavity, it goes without saying that the position of the mandrel and mold may be reversed or that the mandrel may be mounted in a position in which its axis is inclined with reference to a vertical axis.

Each half die comprises a central or main body portion 10 (hereinafter called carrier) which defines the major part of the corresponding cavity 11, a first fin forming and separating element 15 which is adjacent to the upper end of the carrier 10, a second fin forming and separating element 16 which is adjacent to the lower end of the carrier 10, and one or more actuating devices which serve to move the elements 15, 16 between the retracted or fin-forming positions of FIG. 1 and the extended or fin-separating positions of FIG. 2. In the embodiment of FIGS. 1 and 2, the actuating means for moving the elements 15, 16 between such fin-forming and fin-separating positions comprises a pair of double-acting hydraulic or pneumatic cylinders 27, 27a one of which is illustrated in axial section. These are the basic component parts of each half die, and the exact construction thereof will be more readily understood following the description of a bottle-like hollow plastic article 51 which is shown in FIG. 3.

This article 51 (hereinafter called bottle) comprises a tubular fluids- or solids-receiving main portion 51a, a bottom wall portion 13 formed with a diametrically extending flat fin 53, a neck portion 12 which is connected to the main portion 51a by an annular or hollow conical shoulder portion 14, and a second fin 52 which comprises a ring 52a adhering to the top 12a of the neck portion 12 by a very thin annular web 57 and two radially extending flat coplanar wings 52b each of which is connected with two thin webs 59, 60. The webs 59 adhere to the exposed side of the shoulder portion 14, and the webs 60 adhere to the neck portion 12. Thus, the ring 52a and the wings 52b toegther form a one-piece flash, burr or fin 52 which may be separated from the bottle 51 by destroying the webs 57, 59 and 60. The connection between the fin 53 and the bottom wall portion 13 comprises a thin web 58. In all instances, the thickness of the webs 57–60 is rather negligible so that the fins 52, 53 may be separated in response to a twist or pull without resorting to knives, scissors or other types of cutting or shearing tools.

Referring again to FIGS. 1 and 2, the lower end portion of the carrier 10 on the half die A defines a squeezing or pinching edge 29 which cooperates with the complementary edge 29 of the other carrier 10 (shown in FIGS. 4a–4e) to form the webs 59 when the mold is closed. The separating element 15 is provided at its lower end with a squeezing or pinching edge 28 which cooperates with a similar pinching edge of the complementary element 15 to form the web 58. The separating element 16 is provided with two squeezing or pinching edges 30, 30a which cooperate with similar edges of the complementary separating element 16 to respectively form the webs 60 and 57. The pinching edges 30a determine the axial length of the neck portion 12. In order to insure stronger adherence of a fin 52 to the separating element 16, the inner surface 16a of the latter is provided with horizontally extending ribs or corrugations 17 which alternate with grooves 18 so that the wings 52b will be formed with complementary corrugations and ribs (shown in FIGS. 4b–4d) which will cause the fin 52 to follow movements of the separating elements 16 to the extended or separating positions of FIG. 2 or 4c. In all embodiments of my invention, the ribs 17 and grooves 18 are at least slightly inclined with reference to the directions in which the separating elements move between retracted and extended positions.

The inner surface 16a of each element 16 may be provided with one or more blind bores 33 or similar recesses which accumulate some surplus plastic material and which also insure that the fins 52 will follow movements of elements 16 to the extended positions shown in FIGS. 2 and 4c. It goes without saying that each upper fin separating element 15 may be provided with similar horizontal or inclined ribs, grooves and/or recesses to insure that the fin 53 will follow the movements of elements 15 to the positions shown in FIGS. 2 and 4c. In FIGS. 4a–4e, one of the elements 15 is shown with horizontal grooves 55 corresponding to grooves 18 in elements 16. Also, the recesses 33 and/or grooves 18, 55 may be replaced by pins, studs, bolts or similar projections which will contribute to retention of the fins 52, 53. The function of such projections will be the same as that of the ribs 17.

The cylinder 27 is vertical and defines a cylinder chamber 19 which receives two pistons 20, 21. The piston 20 is connected with a piston rod 22 which is anchored in the element 16 by a radial screw 22a. The piston rod 23 of the piston 21 is anchored in the element 15 by a radial screw 23a. The wall of the cylinder 27 defines a central port 25 which may admit or evacuate compressed air or another pressure medium from the space between the pistons 20, 21. A lower port 24 admits or evacuates pressure medium from the space beneath the piston 20, and a third port 26 admits or evacuates pressure medium from the space above the piston 21. The operation of this double-acting cylinder 27 is self-evident. Thus, when the hydraulic or pneumatic control circuit of the mold admits pressure medium through the ports 24, 26 and allows pressure medium to escape through the port 25, the pistons 20, 21 will move toward each other and the separating elements 15, 16 will be retracted to the positions shown in FIG. 1. When the port 25 admits pressure medium and the pressure medium is free to escape through the ports 24 and 26, the pistons 20, 21 will move away from each other and the separating elements 15, 16 will be moved to the extended positions of FIG. 2. The construction of the second cylinder 27a is the same. It is to be noted here that the actuating means for moving the separating elements 15, 16 between the positions of FIGS. 1 and 2 may comprise purely mechanical or electrical parts. For example, electromagnets may be used as substitutes for the cylinders 27, 27a.

The separating element 16 is provided with a substantially semicylindrical trough-shaped channel 61 which accommodates one half of the neck portion 12 and one half of the ring 52a. This channel 61 is mirror symmetrical with the channel of the complementary separating element 16 (shown in FIGS. 4a–4e) to define therewith a composite channel which communicates with the mold cavity and receives a portion of the blowing mandrel.

FIGS. 4a to 4e illustrate the half die A and the complementary mold section or half die B. In FIG. 4a, the blow mold including these two half dies is open to provide room for a blank in the form of a tubular parison 54 which is extruded through the orifice of an extruder in a manner well known in the art. The lower end portion of the parison 54 surrounds the tip of a blowing mandrel 50 which is connected to a source 50a of compressed gas by means of a conduit 50b containing a suitable regulating valve 50c. The mandrel 50 extends through and beyond an annular removing or stripping device 62 supported by a frame member 62a. Obviously, the tubular parison 54 may be replaced by a different blank, for example, by two parallel strip-shaped foils of thermoplastic material. The mandrel 50 is reciprocable up and down by the piston rod 70a of a cylinder 70 shown in FIG. 4b.

The half dies A, B are movable toward and away from each other by two horizontal cylinders whose piston rods are indicated at 10a, 10b. These piston rods may move the half dies A, B between the positions of FIG. 4a in which the mold is open and the positions of FIG. 4b in which the mold is closed or shut. When the mold is closed, the mandrel 50 is maintained at a level at which it extends into the mold cavity 11a (consisting of the cavities 11 defined by the half dies A, B) so that it may calibrate the neck portion 12 of the bottle 51. FIG. 4b illustrates the mold and the mandrel 50 in positions they assume during or subsequent to admission of a compressed gas from the source 50a, i.e., the main portion 51a of the bottle 51 is fully expanded and follows closely the outlines of surfaces which surround the mold cavity 11a. The cooperating pinching edges 28 define the web 58 which connects the fin 53 with the bottom wall portion 13, and the cooperating pairs of pinching edges 29, 30, 30a respectively define the webs 59, 60 and 57 which connect the fin 52 with the shoulder portion 14 and neck portion 12. As explained above, the inner surface of the separating element 15 on the half die B is formed with transversely extending grooves 55 which receive some plastic material forming part of the fin 53 to insure that this fin cannot become separated from the separating elements 15 when the pistons 21 (not shown in FIGS. 4a to 4e) are caused to move upwardly and to shift the separating elements 15 to the extended positions of FIG. 2 or 4c. In other words, when the separating elements 15 are moved to their extended positions (while the mold remains closed or while the mold begins to move to its open position), the fin 53 is automatically detached from the bottom wall portion 13 in response to destruction of the web 58.

The lower fin 52 is automatically separated in a similar fashion as soon as the separating elements 16 begin to move to the extended positions of FIG. 4c. The wings 52b (not seen in FIGS. 4b–4d) of this lower fin 52 are formed between and adhere to the inner surfaces 16a of the separating elements 16 because their material fills some or all of the grooves 18 and recesses 33 whereby the entire lower fin 52 moves with or along the periphery of the mandrel 50 to take the position of FIG. 4c. In the next step, the piston rods 10a, 10b open the mold by moving the half dies A, B to the positions shown in FIG. 4d whereby the fin 53 adheres to the right-hand separating element 15 which is provided with the grooves 55. The fin 52 is supported by the mandrel 50, and this mandrel also supports the finished bottle 51 because the tip of the mandrel continues to extend into the neck portion 12. The right-hand separating element 15 cooperates with a stationary or reciprocable stripping device 56 which is located in or which may be moved into the path of the fin 53 to separate this fin from the right-hand separating element 15 and to allow it to drop into a suitable receptacle or to be sucked up by the intake end of a pneumatic conveyor, not shown. The mandrel 50 is then moved downwardly to take the position of FIG. 4e whereby the stripping device 62 removes first the fin 52 and then the bottle 51 so that the mold is ready for the next operation.

It will be readily understood that the dimensions of the wings 52b will vary from bottle to bottle and, in certain instances, the quantity of surplus plastic material at the neck-forming end of the mold will be such that the fin 52 will consist solely of a ring 52a. In other words, the dimensions and/or the presence of the wings 52b will depend on the wall thickness of the parison, on the diameter of the parison and on the distance between fin-engaging inner surfaces 16a of the separating elements 16. The annular space between the lower portions of the carriers 10 and the periphery of the mandrel 50 accommodates the neck portion 12 and any surplus of plastic material which extends downwardly beyond such annular space will form the ring 52a. The wings 52b will be formed if the volume of this annular space is too small so that some surplus plastic material must escape laterally to fill the gaps between the inner surfaces 16a at the opposite sides of the mandrel 50 (i.e., in a plane which is perpendicular to the planes of FIGS. 4a–4e). Of course, the elements 16 will invariably separate the fin 52 even if this fin consists solely of the ring 52a because the material of the ring will adhere to the corresponding portions of the separating elements 16 and will follow their movements to the extended positions of FIG. 4c. For example, if the mold is utilized for mass production of plastic bottles and if the dimensions of consecutive parisons are selected in such a way that the fins 52 are without wings 52b, the construction of the separating elements 16 may be modified insofar as these elements will then merely surround the rings 52a, i.e., in such instances the separating elements 16 need not surround the neck portion 12 and will extend only to the top 12a rather than to the shoulder portion 14. The dimensions of the separating elements 16 shown in FIGS. 1 and 2 are selected in such a way that these elements extend all the way to the shoulder portions 14 of consecutively formed bottles 51.

FIG. 4b illustrates coolant-conveying channels 10c provided in the carriers 10 and serving to circulate water or another suitable coolant which will cause the material of a freshly formed bottle 51 to set so that the mold may be opened shortly after the mandrel 50 admits a blast of compressed gas. Similar channels may be provided in the separating elements 15, 16, and it is equally possible to cool the mold by blasts or sprays of a coolant which impinges against the external surfaces of the separating elements 15, 16 and/or carriers 10. The mold is opened as soon as the material of a freshly formed bottle 51 has hardened sufficiently to insure that the bottle is self-supporting and cannot undergo any, or does not undergo excessive deformation when it is supported solely by the mandrel 50 (see FIG. 4d).

The cooperating pairs of pinching edges 28, 29 and 30 remain slightly spaced from each other even when the mold is closed. Also, the pinching edges 30a remain slightly spaced from the periphery of the mandrel 50 when the half dies A, B are moved to the positions shown in FIG. 4b. Any surplus material at the other end of the parison flows into the gap between the inner surfaces of the elements 15 and forms the fin 53, and the material (if any) escaping between the pinching edges 29 and 30 while the half dies are being moved to the position shown in FIG. 4b will form the wings 52b. Of course, the bulk of plastic material which forms the fin 53 is due to the fact that the uppermost portion of the parison 54 constitutes surplus material; analogously, the bulk of the ring 52a will normally be due to the fact that the lowermost part of the parison 54 constitutes surplus material.

As shown in FIG. 4c, the separting elements 15, 16 are moved to their extended positions while the mold including the half dies A, B remains closed. However, the operation of the apparatus may be modified insofar as the elements 15, 16 will separate the fins 53, 52 even if the half dies begin to move away from each other simultaneously with a movement of the elements 15, 16 to their extended positions. Thus, the depth of the grooves 18 in the inner surfaces 16a of the separating elements 16 suffices to insure that the wings 52b are entrained even if the elements 16 are partially separated from each other, as long as the ribs 17 continue to extend into complementary grooves of the wings. For example, the elements 15, 16 may separate the fins 53, 52 while the half dies A, B cover about one tenth of the distance between the closed and open positions of the mold. As a rule, the separation of fins will be completed no later than when the half dies A, B cover between two and three tenths of such distance. The separating action of the elements 15, 16 is so rapid that the fins 52, 53 are completely separated immediately after the elements 15, 16 begin to move to their extended positions. This is due to the fact that the webs 57–60 are very thin, that the material of the fins has set sufficiently to allow for breaking or tearing of webs, and that the elements 15, 16 grip the fins without slippage. It can be said that the elements 15, 16 form two pairs of cooperating corrugated, ribbed, grooved, recessed or otherwise roughened jaws or claws which rip the fins off the adjacent portions of the bottle. If the movement of elements 15, 16 to the extended positions of FIG. 4c takes place simultaneously with a movement of the half dies A, B to the open positions of FIG. 4d, the separation of fins 52, 53 from the finished bottle 51 is normally completed in the very first stage of such movement. In all instances, the separation of fins is preferably completed at the time the half dies reach the positions shown in FIG. 4d. Thus, though the mandrel 50 supports the neck portion 12 and the fin 52, the latter is separated from the neck portion because the web 57 is already destroyed. When the mandrel thereupon descends to take the position of FIG. 4e, the removal of the fin 52 follows the ejection of the bottle 51. It is to be understood that the bottle 51 may be ejected by a blast of compressed gas issuing from the orifice of the mandrel 50.

The grooves 55 in the right-hand separating element 15 of FIGS. 4a–4e retain the fin 53 and move it against the stripping device 56. As stated above, the stripping device 56 may be mounted to reciprocate in a horizontal plane; for example, this stripping device may constitute the piston rod of a cylinder which is operated in synchronism with the operation of other cylinders in or on the mold so as to separate the fin 53 at a certain stage of the operation following a movement of the separating elements 15 to the extended positions of FIG. 4c or 4d.

The depth of recesses 33 will determine the extent to which the half dies A, B may move away from each other before the elements 16 complete the separation of the fin 52. Thus, if the depth of such recesses exceeds only slightly the depth of grooves 18, the separation of the fin 52 must be completed shortly after the ribs 17 are detached from the wings 52b. Of course, the provision of recesses 33 constitutes a precautionary measure because the ribs 17 will normally suffice to insure that the fin 52 is invariably separated from the bottle 51, especially if the separating elements 16 move away from the carriers 10 while the mold is still closed. Alternatively, the ribs 17 and grooves 18 may be omitted if the fin-engaging inner surface 16a of at least one of the separating elements 16 is provided with one or more recesses 33.

The modified mold section or half die A' of FIG. 5 differentiates from the half die A or B mainly in that its carrier 10' supports two pivotable or rockable fin forming and separating elements 34, 35 which respectively correspond to the separating elements 15, 16 of FIGS. 1 and 2. Furthermore, contrary to the construction of half dies A and B, the pinching edges 28', 30' of the carrier 10' remain spaced from the separating elements 34, 35 even if these elements are pivoted to the retracted or fin-forming positions of FIG. 5. Thus, the carrier 10' comprises a first wall portion 36 which extends between the pinching edge 28' and separating element 34, and a second wall portion 37 which extends between the pinching edge 30' and the separating element 35. The fin-engaging faces of these wall portions 36, 37 diverge outwardly and away from the cavity 11', namely, in directions toward the separating elements 34, 35. These separating elements are respectively rockable about pivots 38, 39 which are mounted in the carrier 10' so that each separating element resembles a two-armed lever having a first arm which comes in actual engagement with the fin 52 and a second arm which is coupled to an actuating cylinder 27' mounted in a space 42 defined by the carrier 10'. The piston rods 22', 23' of the cylinder 27' are respectively connected to the separating elements 35, 34 by means of bolts 41, 40 or the like, and the cylinder 27' is fixed to the carrier 10'. When the piston rods 23', 22' are retracted into the cylinder 27' (which may be a pneumatic or a hydraulic cylinder), the separating elements 34, 35 respectively rock about the axes of their pivots 38, 39 and their fin-engaging inner surfaces 34a, 34b move in directions away from the cavity 11' to destroy the webs which are formed by the pinching edges 28', 30'. The directions in which the inner surfaces 34a, 35a of the separating elements 34, 35 must pivot to reach their extended or fin-separating positions are indicated by arrows 46. The arrows 43, 44 indicate the directions in which the pins 40, 41 move in response to retraction of the piston rods 23', 22'. It will be noted that the inner surfaces 34a, 35a are respectively provided with horizontally extending grooves 45 and 47 to insure that the corresponding fins are invariably separated from the hollow plastic article when the inner surfaces 34a, 35a are caused to pivot in directions indicated by arrows 46. The groove 47 will accommodate a portion of the ring 52a and the groove 45 will accommodate a portion of the fin 53.

Of course, the half die A' is assembled with a similar half die which also carries two separating elements corresponding to the elements 34, 35 whereby such separating elements cooperate with each other to positively destroy the webs which connect the respective fins with the freshly formed hollow plastic article. An important advantage of pivotally mounted separating elements 34, 35 is that the inner surfaces 34a of the cooperating elements 34 and the inner surfaces 35a of cooperating elements 35 will move slightly toward each other when the cylinder 27' begins to retract the piston rods 23', 22' whereby the right-hand arms of the elements 34, 35 shown in FIG. 5 act not unlike claws or jaws to even more strongly grip the respective fins and to insure rapid destruction of webs which are formed by the pinching edges 28', 30'. Of course, when the cooperating inner surfaces 34a of the elements 34 begin to move away from the cavity 11', these elements will destroy the web along a line which is immediately adjacent to the pinching edges 28' and not at the top of the wall portion 36 so that the elements 34 will also separate that portion of the fin 53 which extends along the outwardly diverging inner faces of the wall portions 36. The same applies for the elements 35 which will separate the fin 52 along a circle which is adjacent to the pinching edges 30'. Otherwise, the operation of the mold which comprises two half dies of the type shown in FIG. 5 is exactly the same as that of the mold shown in FIGS. 4a–4e.

It will be seen that the elements 35 of half dies corresponding to the half die A' of FIG. 5 are arranged to engage only the rings 52a of fins 52 whereby the wings 52b develop between the inner surfaces of the carriers 10'. However, despite such construction of the elements 35, they are capable of separating the entire fin 52 because the integral connection between the wings 52b and the ring 52a is much stronger (see FIG. 3) than the connections between the wings 52b and the neck portion 12 and/or shoulder portion 14. In other words, as soon as the inner surfaces 34a, 35a begin to pivot in directions indicated by arrows 46, they will break not only the web which is formed by the pinching edges 30' but also the webs corresponding to the webs 59, 60 of FIG. 3, especially if the carriers 10' are moved apart even so slightly before the elements 35 begin to rock toward their extended positions.

I wish to mention further that the position of the half die A' and of the cooperating second half die may be reversed so that the elements 35 will be located at a level above the carriers 10'. The mandrel (not shown in FIG. 5) is then introduced from above to extend into a portion 11b' of the cavity 11' and to cooperate with the carrier 10' to form the neck portion 12 of a bottle.

The mandrel 50 may begin to descend simultaneously with the movement of half dies to their open positions or, alternatively, the mandrel may be held against movement while the half dies move away from each other, and the mandrel thereupon descends in a single movement all the way to its lower end position shown in FIG. 4e. If the webs 57, 59, 60 are comparatively thick and if the friction between the mandrel 50 and fin 52 is considerable, the mandrel will be caused to descend simultaneously with movement of elements 16 or 35 to their extended positions so that it may contribute to rapid separation of the fin 52.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for transforming plastic blanks into bottles and similar hollow articles, comprising an open and shut mold having two sections each comprising a carrier and a separating element, said carriers being movable with the respective separating elements toward and away from each other and each separating element being movable with reference to the respective carrier between a separating and a retracted position, said sections together defining a blank-receiving mold cavity and having cooperating pinching edges to form in the blank webs which connect a freshly formed article with fins constituting surplus material of the blank, the separating elements of said sections having fin-engaging surfaces provided with channels which communicate with said cavity when the mold is shut and the separating elements are moved to retracted positions; a blowing mandrel arranged to extend through said channels and into said cavity so as to expand the blank against said sections whereby surplus material which has penetrated between said surfaces produces fins and said edges form webs which connect the fins with the thus obtained article; and actuating means for reciprocating the fin-engaging surfaces of said separating elements whereby the separating elements destroy the webs and thus separate the fins from the article on movement from said retracted positions.

2. An apparatus as set forth in claim 1, wherein said separating elements are pivotably mounted on and are rockable with reference to their carriers so that said fin-engaging surfaces are movable back and forth substantially in the axial direction of said mandrel.

3. An apparatus as set forth in claim 1, wherein said fin-engaging surfaces are uneven.

4. An apparatus as set forth in claim 3, wherein the fin-engaging surfaces of said separating elements are provided with ribs and grooves which are inclined with reference to movement of said separating elements between the separating and retracted positions thereof.

5. An apparatus as set forth in claim 3, wherein the fin-engaging surfaces of said separating elements are provided with recesses which accommodate portions of fins to insure that the fins follow movements of said separating elements to said separating positions.

6. An apparatus as set forth in claim 3, wherein the fin-engaging surfaces of said separating elements are roughened.

7. An apparatus as set forth in claim 1, further comprising means for moving said sections away for each other following the movement of said separating elements to separating positions.

8. An apparatus as set forth in claim 1, further comprising means for moving said carriers away from each other simultaneously with movement of said separating elements to separating positions.

9. An apparatus for transforming plastic blanks into bottles and similar hollow open-ended articles as set forth in claim 1, wherein said pinching edges define with the periphery of said mandrel and annular web to connect a ring-shaped portion of the fin with the open end of the article, said ring-shaped portion being surrounded by said separating elements in the retracted positions thereof.

10. An apparatus as set forth in claim 9, further comprising means for stripping the ring-shaped fin portions off the periphery of said mandrel.

11. An apparatus as defined in claim 1, wherein said separating elements resemble claws which are mounted on the respective carriers.

12. An apparatus as defined in claim 1, wherein said separating elements are reciprocable in the axial direction of said mandrel.

13. An apparatus as defined in claim 1, wherein said fin-engaging surfaces are arranged to engage only the fins.

14. An apparatus for transforming plastic blanks into bottles and similar hollow open-ended articles of the type having a bottom wall portion at one end and a neck portion at the other end thereof, said apparatus comprising an open and shut mold having two sections each comprising a carrier and a pair of separating elements, said carriers being movable with the respective separating elements toward and away from each other and each separating element being movable with reference to the respective carrier between a separating and a retracted position, said sections together defining a blank-receiving mold cavity and having cooperating pinching edges to form in the blank webs which connect a freshly formed article with two fins constituting surplus material of the blank and respectively adhering to the bottom wall portion and to the neck portion of an article, the separating elements of said sections having fin-engaging surfaces and one separating element of each section having a channel which communicates with said cavity when the mold is shut and the separating elements are moved to said retracted positions whereby the channels accommodate that fin which adheres to the neck portion of an article, the other separating element of each section being arranged to engage that fin which adheres to the bottom wall portion of an article; a blowing mandrel arranged to extend through said channels and into said cavity so as to expand the blank against said sections whereby surplus material which has penetrated between said surfaces produces fins and said edges form webs which connect the fins with the bottom wall portion and the neck portion of the thus obtained article; and actuating means for reciprocating the fin-engaging surfaces of said separating elements between said positions whereby the elements destroy said webs and thus separate the fins from the article on movement from said retracted positions.

15. An apparatus as set forth in claim 14, wherein said actuating means comprises first actuating means provided on one of said carriers and common to both separating elements of the respective section, and second actuating means provided on the other carrier and common to both separating elements of the respective section.

16. Apparatus for transforming plastic blanks into hollow articles, comprising two opposed sections each comprising a carrier and a pair of separating elements supported by and movable with reference to the respective carrier between a separating and a retracted position, said carriers being movable toward and away from each other and said sections together defining a blank-receiving mold cavity, said separating elements having cooperating pinching edges to form in the blank webs which connect a freshly formed article with fins constituting surplus material of the blank and respectively adhering to the bottom wall portion and to the neck portion of an article, said separating elements further having fin-engaging surfaces and one separating element of each section having a channel which communicates with said cavity when the mold is closed and the separating elements are held in retracted positions; a blowing mandrel arranged to extend into said channels to expand the blank in said cavity against said sections whereby surplus material which has penetrated between said surfaces forms fins and said pinching edges form webs which connect the fins to the thus obtained article; and common actuating means for the separating elements of each of said sections, said actuating means being provided on the respective carriers and being operative to move the respective elements from retracted to separating positions whereby said elements destroy said webs.

References Cited

UNITED STATES PATENTS

| | | | |
|---|---|---|---|
| 3,031,718 | 5/1962 | Adams | 264—98 X |
| 3,209,400 | 10/1965 | Di Lettembrini | 18—5 |
| 3,141,196 | 7/1964 | Langecker | 18—5 |
| 3,295,159 | 1/1967 | Fischer | 18—5 |

FOREIGN PATENTS

| | | |
|---|---|---|
| 221,038 | 3/1958 | Australia. |
| 375,738 | 6/1962 | Japan. |

WILBUR L. McBAY, *Primary Examiner.*

J. SPENCER OVERHOLSER, *Examiner.*